(12) United States Patent
Lee et al.

(10) Patent No.: US 9,990,532 B2
(45) Date of Patent: Jun. 5, 2018

(54) FINGERPRINT DATA REGISTERING METHOD AND FINGERPRINT DATA REGISTERING APPARATUS

(71) Applicant: SUPREMA INC., Gyeonggi-do (KR)

(72) Inventors: Jong Man Lee, Gyeonggi-do (KR); Hyeonchang Lee, Gyeonggi-do (KR); Kideok Lee, Gyeonggi-do (KR); Hochul Shin, Gyeonggi-do (KR); Bong Seop Song, Gyeonggi-do (KR); Jae Won Lee, Gyeonggi-do (KR)

(73) Assignee: SUPREMA INC., Seongnam-si, Gyeonggi-Do (KR)

( * ) Notice: Subject to any disclaimer, the term of this patent is extended or adjusted under 35 U.S.C. 154(b) by 71 days.

(21) Appl. No.: 15/204,655

(22) Filed: Jul. 7, 2016

(65) Prior Publication Data

US 2017/0046584 A1 Feb. 16, 2017

(30) Foreign Application Priority Data

Aug. 10, 2015 (KR) ........................ 10-2015-0112444

(51) Int. Cl.
*G06K 9/00* (2006.01)
(52) U.S. Cl.
CPC ....... *G06K 9/0008* (2013.01); *G06K 9/00013* (2013.01); *G06K 9/00912* (2013.01)

(58) Field of Classification Search
CPC ............ G06K 9/0008; G06K 9/00026; G06K 9/00013; G06K 9/00912; G06T 5/003
USPC .................................................. 382/124–125
See application file for complete search history.

(56) References Cited

U.S. PATENT DOCUMENTS

| | | | |
|---|---|---|---|
| 2014/0003677 A1* | 1/2014 | Han | G06K 9/00006 382/124 |
| 2015/0131876 A1* | 5/2015 | Chang | G06K 9/00013 382/124 |
| 2016/0239701 A1* | 8/2016 | Lee | G06F 21/32 |

* cited by examiner

*Primary Examiner* — Daniel Mariam
(74) *Attorney, Agent, or Firm* — Brinks Gilson & Lione (57) ABSTRACT

In a fingerprint data registering method, a blurred pseudo image is displayed and, when a fingerprint image for authentication registration is acquired, a fingerprint position of the acquired fingerprint image is extracted. A position in the pseudo image, which corresponds to the extracted fingerprint position, is determined. A part of the blurred pseudo image at the determined corresponding position is converted to a clear partial pseudo-image having a higher resolution than that of the blurred pseudo image and the clear partial pseudo-image is displayed. The acquired fingerprint image is registered as an authentication-purpose fingerprint image in association with the converting and outputting process.

11 Claims, 10 Drawing Sheets

FINGERPRINT DATA REGISTERING METHOD AND FINGERPRINT DATA REGISTERING APPARATUS

CROSS-REFERENCE TO RELATED APPLICATIONS

This application claims priority to Korean Patent Application No. 10-2015-0112444 filed on Aug. 10, 2015, the entire contents of which is incorporated herein by reference.

TECHNICAL FIELD

The present disclosure relates to a technique of registering fingerprint data and, more particularly, to a fingerprint data registering method and a fingerprint data registering apparatus suitable for effectively registering a fingerprint to be used for user authentication in an electronic device such as a portable terminal or the like.

BACKGROUND

In recent years, there is a tendency that the application of biometric authentication to the personal authentication in a portable terminal such as a smartphone or the like and the security authentication in a gate becomes widespread. Particularly, there have been many different attempts to apply fingerprint authentication to a portable terminal.

In general, when performing personal authentication through the use of a fingerprint, a false rejection rate may act as a factor sensitive to a user in the case of an electronic device having a high use frequency such as a portable terminal, e.g., a smartphone. Accordingly, it becomes a very important factor to reduce the false rejection rate by acquiring a larger amount of characteristic information on a user fingerprint.

However, a small fingerprint recognition sensor mounted to an electronic device such as a smartphone or the like has a relatively small size and, therefore, can acquire only an image which contains a partial region of the entire fingerprint. Thus, it is difficult for the small fingerprint recognition sensor to acquire a larger amount of characteristic fingerprint information.

For that reason, in an electronic device such as a portable terminal or the like provided with a small fingerprint recognition sensor, a plurality of fingerprint images is acquired in a fingerprint recognition process for registering an authentication-purpose fingerprint. For example, a portable terminal such as a smartphone or the like is designed so as to acquire several tens of registration-purpose fingerprint images.

In this connection, the number of registered fingerprint images is not necessarily proportional to the amount of fingerprint information. This is because fingerprint images may be continuously acquired in similar positions when acquiring a user's fingerprint.

In view of the aforementioned points, it is very important to guide a user to input a fingerprint in different positions. Most of conventional fingerprint recognition devices are configured to merely show a progress level of fingerprint registration through a progress bar or a change in image color.

Accordingly, the conventional method has a problem in that it is difficult to guide a user to acquire a fingerprint of a finger region other than a finger region whose fingerprint has been already acquired. This problem may eventually act as a major cause of increasing a false rejection rate at a fingerprint recognition (fingerprint authentication) step which will be performed after registration of a fingerprint (see, e.g., Korean Patent Application Publication No. 2010-0127432).

SUMMARY

The present disclosure provides a fingerprint data registering technique capable of, when fingerprint registration is performed in an electronic device, visualizing a position of a fingerprint registered at the present time, displaying the position of the fingerprint on a display panel (visual feedback) and consequently realizing natural guide of a finger to a position for acquiring a non-acquired fingerprint. The present disclosure has been achieved in a project (WC300 project) carried out by the present inventors.

According to embodiments, there are provided a method of registering fingerprint data by displaying a position of a fingerprint registered at the present time on a display panel, a computer program for executing the fingerprint data registering method, and a computer-readable storage medium storing the computer program.

The objects are not limited to those referred to above. Other objects will be clearly understood from the following descriptions by a person having an ordinary knowledge in the field to which the present disclosure pertains.

In accordance with a first aspect, there is provided a fingerprint data registering method, including: blurring a fingerprint-shaped pseudo image and displaying the blurred pseudo image; extracting a fingerprint position of a fingerprint image acquired for authentication registration; determining a position in the pseudo image, which corresponds to the extracted fingerprint position; converting a part of the blurred pseudo image at the corresponding position to a clear partial pseudo-image having a higher resolution than that of the blurred pseudo image and displaying the clear partial pseudo-image; and registering the acquired fingerprint image as an authentication-purpose fingerprint image in association with the converting and displaying process.

The fingerprint position of the acquired fingerprint image may be one of an inside area including a fingerprint core and an outside area surrounding the inside area.

The outside area may include a plurality of partial outside areas distributed around the fingerprint core.

The extracting process may include: extracting a fingerprint ridge from the acquired fingerprint image; measuring a curvature of the extracted fingerprint ridge; determining presence or absence of the fingerprint core based on a direction histogram using the measured curvature; and determining whether the fingerprint position is a fingerprint position in the inside area or a fingerprint position in one of the partial outside areas, based on a determination result in the process of determining presence or absence of the fingerprint core.

The fingerprint data registering method may further include: converting the blurred pseudo image to a clear pseudo image having a higher resolution than that of the blurred pseudo image and displaying the clear pseudo image, when registration of an authentication-purpose fingerprint image with respect to the inside area and the partial outside areas is completed by repeatedly performing the extracting process, the determining process, the converting and displaying process and the registering process a predetermined number of times.

The part of the blurred pseudo image may be converted to and displayed as the clear partial pseudo-image in such a way that the resolution gradually increases.

The clear partial pseudo-image may be maintained for a predetermined time and then converted to and displayed as an intermediate partial pseudo-image which has a resolution higher than that of the blurred partial pseudo-image but lower than that of the clear partial pseudo-image.

In accordance with a second aspect, there is provided a computer-readable storage medium which stores a program configured to execute the fingerprint data registering method described above.

In accordance with a third aspect, there is provided a computer program stored in a storage medium to execute the fingerprint data registering method described above.

In accordance with a fourth aspect, there is provided a fingerprint data registering apparatus, including: a pseudo-image display unit configured to blur a pseudo-fingerprint image and to display the blurred pseudo image on a display panel; a fingerprint position extraction unit configured to extract a fingerprint position from a fingerprint image acquired by a sensor; a corresponding position determination unit configured to determine a position in the pseudo image, which corresponds to the extracted fingerprint position; a pseudo-image processing unit configured to convert a part of the blurred pseudo image at the determined corresponding position to a clear partial pseudo-image having a higher resolution than that of the blurred pseudo image and to display the clear partial pseudo-image; and a fingerprint registration unit configured to register the acquired fingerprint image as an authentication-purpose fingerprint image in a memory in association with the conversion to the clear partial pseudo-image.

The fingerprint position extraction unit may include: a ridge extraction module configured to extract a fingerprint ridge from the fingerprint image; a curvature calculation module configured to measure a curvature of the extracted fingerprint ridge; an image analysis module configured to analyze presence or absence of a fingerprint core in the fingerprint image based on a direction histogram using the measured curvature; and an area determination module configured to determine that the fingerprint image is acquired from a fingerprint position of an inside area if the fingerprint core exists in the fingerprint image, and to determine that the fingerprint image is acquired from a fingerprint position of an outside area if the fingerprint core does not exist in the fingerprint image.

The outside area may include a plurality of partial outside areas distributed around the fingerprint core, and the fingerprint position extraction unit may be configured to extract one of the partial outside areas as the fingerprint position.

The pseudo-image processing unit may be configured to convert the blurred pseudo image to a clear pseudo image having a higher resolution than that of the blurred pseudo image and to display the clear pseudo image, when registration of an authentication-purpose fingerprint image with respect to the inside area and the partial outside areas is completed.

The pseudo-image processing unit may be configured to convert the part of the blurred pseudo image to the clear partial pseudo-image and to display the clear partial pseudo-image in such a way that the resolution gradually increases.

The pseudo-image processing unit may be configured to maintain the clear partial pseudo-image for a predetermined time and then to convert the clear partial pseudo-image to an intermediate partial pseudo-image and to display the intermediate partial pseudo-image, the intermediate partial pseudo-image having a resolution higher than that of the blurred pseudo image but lower than that of the clear partial pseudo-image.

With such configurations, when fingerprint registration is performed in an electronic device, a position of a fingerprint registered at the present time is displayed on a display panel to realize natural guide of a finger to a position for acquiring a non-acquired fingerprint. This makes it possible to effectively suppress an undesirable increase of a false rejection rate at a fingerprint authentication step.

DETAILED DESCRIPTION

Advantages, features and methods for achieving them will become apparent from the embodiments which will be described later in detail with reference to the accompanying drawings. However, the present disclosure is not limited to the embodiments described herein below but may be implemented in many different forms. The embodiments are provided to make complete the present disclosure and to completely inform the scope of the present disclosure to a person having an ordinary knowledge in the field to which the present disclosure pertains. The present disclosure is defined only by the claims.

In describing the embodiments of the present disclosure, the detailed descriptions of well-known functions or configurations will be omitted if it is determined that the detailed descriptions of well-known functions or configurations may unnecessarily make obscure the spirit of the present disclosure. The terms to be described later are defined in view of the functions exercised in the embodiments of the present disclosure and may vary depending on the intention of a user or an operator and the practice. Thus, the definition of terms shall be made based on the overall contents of the subject specification.

An embodiment of the present disclosure will now be described in detail with reference to the accompanying drawings.

Figure 1:
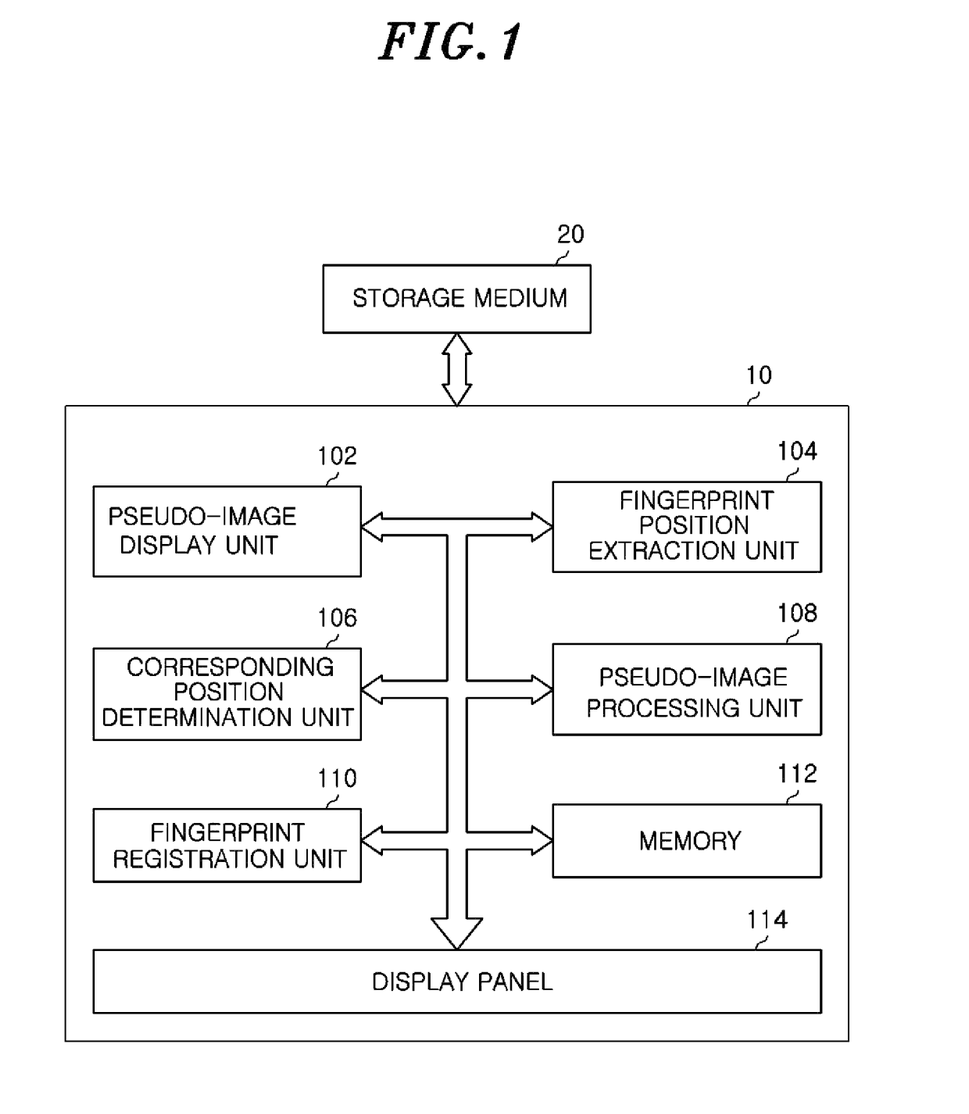
FIG. 1 is a block diagram of a fingerprint data acquisition apparatus according to an embodiment.

FIG. 1 is a block diagram of a fingerprint data registering apparatus 10 according to the present embodiment. The fingerprint data registering apparatus may include a pseudo-image display unit 102, a fingerprint position extraction unit 104, a corresponding position determination unit 106, a pseudo-image processing unit 108, a fingerprint registration unit 110, a memory 112, a display panel 114, and so forth.

First of all, the fingerprint data registering apparatus may be defined as a fingerprint recognition module which can be installed in a portable electronic device or the like. The electronic device may refer to a portable terminal such as, for example, a mobile communication terminal, a personal portable communication terminal, a smartphone, a wireless LAN terminal, a smart pad, a tablet PC or a slate PC.

Referring to FIG. 1, the pseudo-image display unit 102 may provide a function of, when a fingerprint registration mode is executed according to a user's operation (interface operation), generating a blurred fingerprint-shaped pseudo image by calling out a fingerprint-shaped pseudo image pre-stored in the memory 112 and performing a blurring process with respect to the pseudo image, and a function of displaying the generated pseudo image on the display panel 114 of a terminal. The reason for displaying the pseudo image rather than an actual fingerprint image on the display panel 114 is to prevent user's actual fingerprint information from being exposed to the outside.

In this regard, the blurring process may be realized by, for example, converting a central pixel value of an N×N pixel block to a median value of the remaining pixel values through a median filtering process, or converting a central pixel value of an N×N pixel block to an average value of pixel values through a low band path filtering process.

Figure 4A:
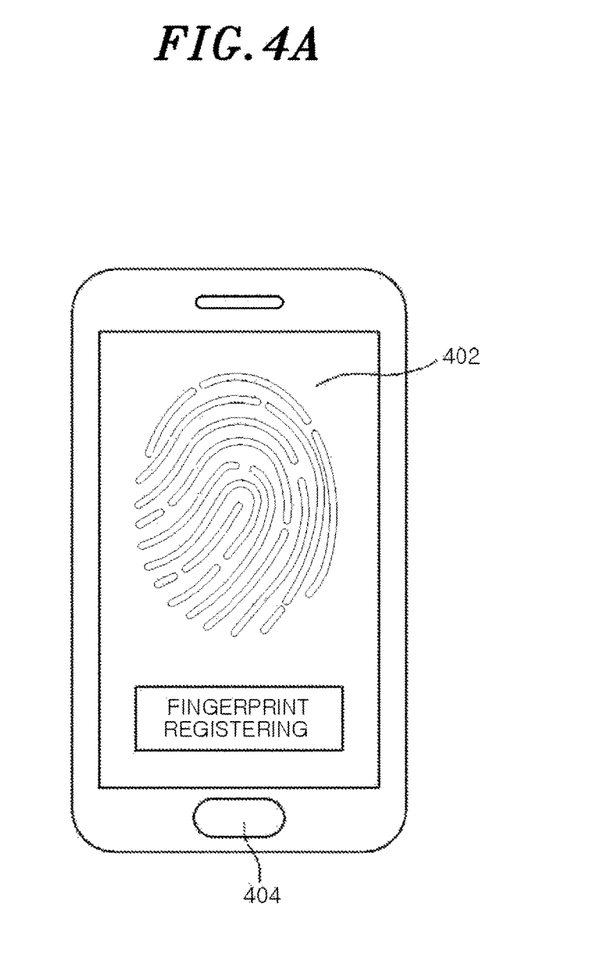
FIGS. 4A to 4F are exemplary terminal screen views for explaining a procedure for registering an authentication-purpose fingerprint image through the acquisition of a partial fingerprint image divided into an inside area and an outside area according to the embodiment.

For example, as illustrated in FIG. 4A, if a fingerprint registration mode is executed according to a user's operation, a blurred fingerprint-shaped pseudo image 402 may be presented to (displayed on) a display panel of a terminal. In FIG. 4A, reference numeral 404 not described designates a fingerprint input window.

The fingerprint position extraction unit 104 may provide a function of acquiring a fingerprint image (or a partial fingerprint image) of a finger of a user from a sensor (fingerprint recognition sensor) 300 mounted to a specified portion of an outer surface of a terminal and extracting a fingerprint position from the acquired fingerprint image. For this purpose, the fingerprint position extraction unit 104 may have, for example, a configuration illustrated in FIG. 2.

As the sensor 300 mounted to the terminal and configured to sense the fingerprint, it may be possible to use, for example, an optical area sensor, an optical swipe sensor, a semiconductor capacitive area sensor, a semiconductor capacitive swipe sensor, an ultrasonic fingerprint sensor, or a pressure-type fingerprint sensor.

Figure 2:
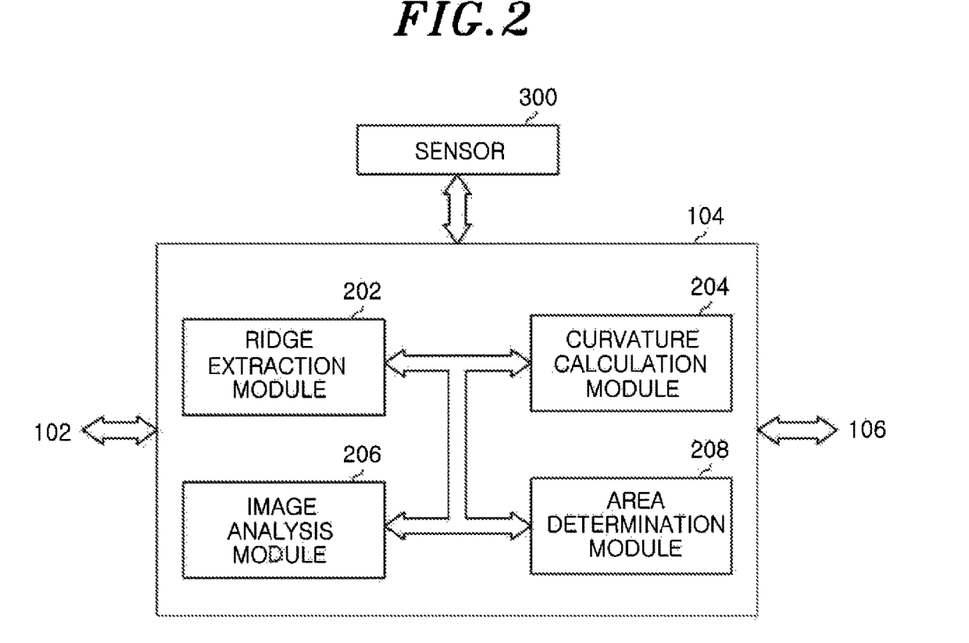
FIG. 2 is a detailed block diagram of a fingerprint position extraction unit illustrated in FIG. 1.

FIG. 2 is a detailed block diagram of the fingerprint position extraction unit illustrated in FIG. 1. The fingerprint position extraction unit 104 may include a ridge extraction module 202, a curvature calculation module 204, an image analysis module 206, an area determination module 208, and so forth.

Referring to FIG. 2, the ridge extraction module 202 may provide a function of extracting a fingerprint ridge from the fingerprint image (or the partial fingerprint image) acquired by the sensor 300 and delivering the extracted fingerprint ridge to the curvature calculation module 204.

The curvature calculation module 204 may provide a function of measuring a curvature of the fingerprint ridge based on the fingerprint ridge information delivered from the ridge extraction module 202 and delivering the measured curvature information to the image analysis module 206.

The image analysis module 206 may provide a function of analyzing the presence or absence of a fingerprint core within the fingerprint image based on a direction histogram using the measured curvature information delivered from the curvature calculation module 204 and delivering the analysis result to the area determination module 208.

In this regard, a circularly converging portion may be defined as a fingerprint core. This fingerprint core may be referred to as an inside area of the entire fingerprint. The remaining area may be referred to as an outside area.

The area determination module 208 may provide a function of, based on the analysis result delivered from the image analysis module 206, determining whether the fingerprint image (or the partial fingerprint image) is acquired from a fingerprint position of the inside area where the fingerprint core exists or a fingerprint position of the outside area (e.g., a partial fingerprint position of a partial outside area) where the fingerprint core does not exist, and delivering the determination result to the corresponding position determination unit 106 illustrated in FIG. 1.

Referring again to FIG. 1, the corresponding position determination unit 106 may provide a function of determining a corresponding position of a pseudo image corresponding to the fingerprint position of the extracted fingerprint image, for example, determining a corresponding position within the pseudo image corresponding to the fingerprint position by matching the fingerprint position of the fingerprint image with the pseudo image, and delivering the determination result to the pseudo-image processing unit 108.

The pseudo-image processing unit 108 may provide a function of converting a part of the blurred pseudo image at the determined corresponding position (e.g., the partial pseudo-image of the inside area including the fingerprint core or the partial pseudo-image of any one of a plurality of predetermined partial outside areas surrounding the inside area) to a clear partial pseudo-image having a higher resolution than that of the blurred pseudo image and displaying the clear partial pseudo-image. The term "clear partial pseudo-image" used herein may refer to an original image not subjected to a blurring process. The partial pseudo-image may be converted to and displayed as a clear partial pseudo-image in such a way that the resolution gradually increases (the partial pseudo-image becomes gradually clear). The term "partial outside area" may refer to a plurality of predetermined partial outside areas distributed and positioned, for example, at the upper, lower, left and right side of the fingerprint core in a plan view.

Figure 4B:
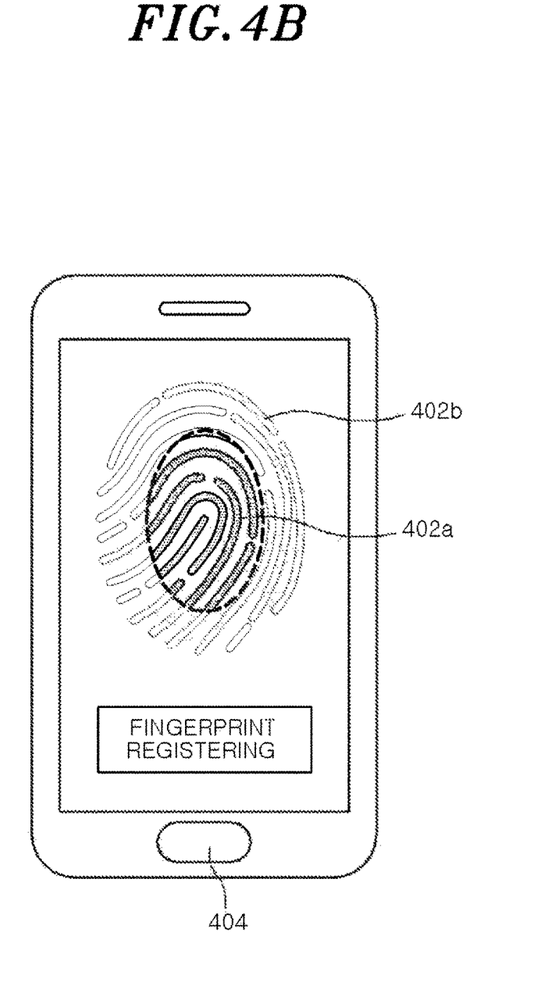

For example, if it is assumed that the partial pseudo-image is of the inside area including the fingerprint core, as illustrated in FIG. 4B as one example, the inside area 402a is converted to a clear partial pseudo-image and displayed on the display panel (visual feedback) while keeping the outside area 402b in a blurred state. Thus, a user who performs fingerprint registration will be able to visually recognize that fingerprint registration has been successfully performed with respect to the inside area of the entire fingerprint.

Figure 4C:
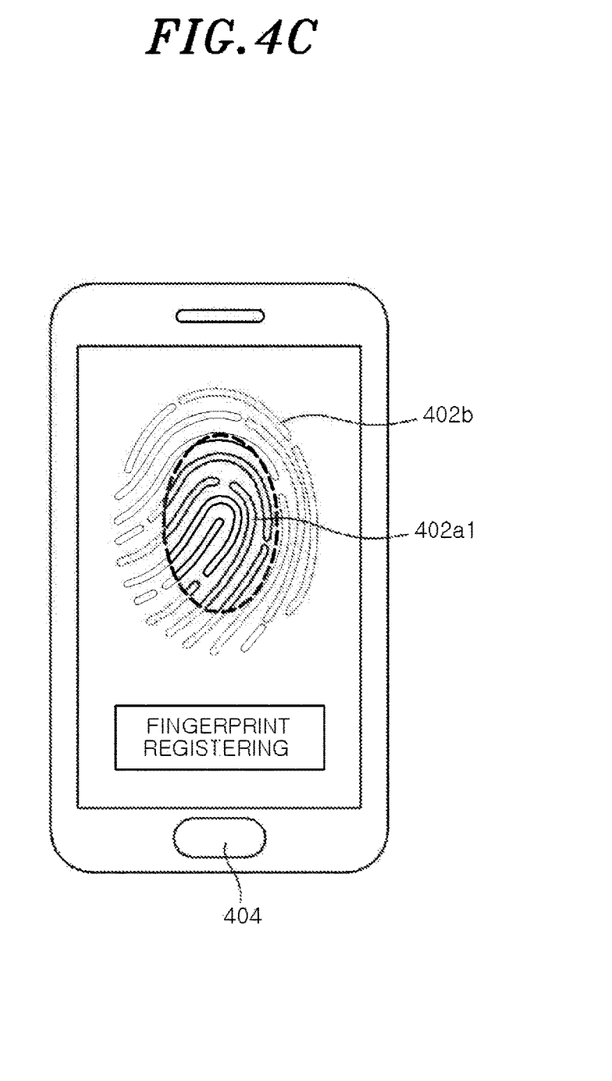

The pseudo-image processing unit 108 may display the inside area 402a as a clear partial pseudo-image for a predetermined time (e.g., 1 second, 1.5 seconds or 2 seconds). Thereafter, as illustrated in FIG. 4C as one example, the pseudo-image processing unit 108 may convert the inside area to an intermediate partial pseudo-image 402a1 having a resolution higher than that of the partial pseudo-image but lower than that of the clear partial pseudo-image and may display the intermediate partial pseudo-image 402a1. Accordingly, a user who performs fingerprint registration will be able to visually recognize that fingerprint registration has been made for a certain portion of the entire fingerprint or that fingerprint registration is to be made for a certain portion of the entire fingerprint.

Figure 4D:
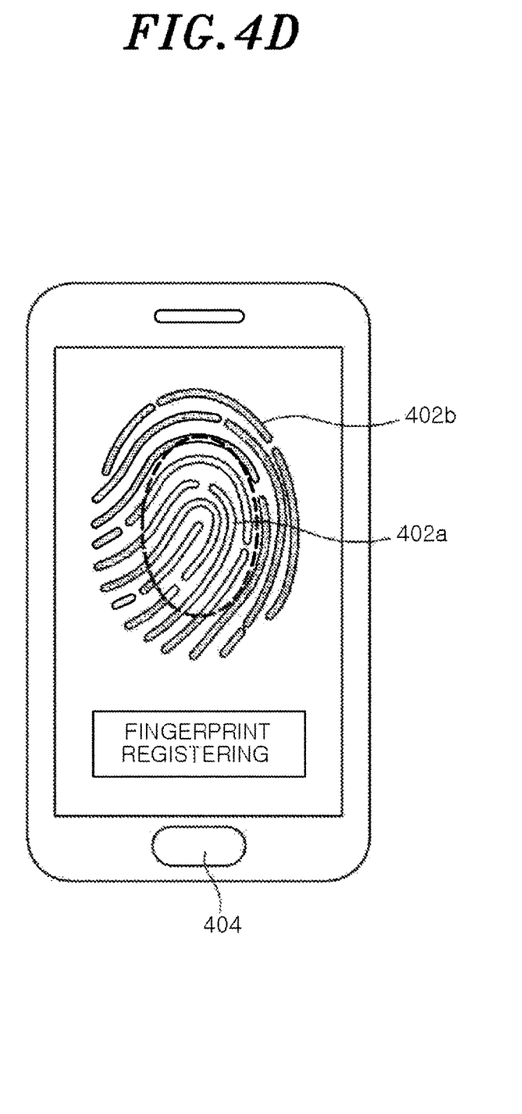

As another example, if it is assumed that the partial pseudo-image is of the outside area not including the fingerprint core, as illustrated in FIG. 4D as one example, the outside area 402b (or the partial outside area) is converted to a clear partial pseudo-image and displayed on the display panel (visually feedback) while keeping the inside area 402a in a blurred state. Thus, a user who performs fingerprint registration will be able to visually recognize that fingerprint registration has been successfully performed with respect to the outside area (or the partial outside area) of the entire fingerprint.

Similarly, the pseudo-image processing unit 108 may display the outside area 402b as a clear partial pseudo-image for a predetermined time (e.g., 1 second, 1.5 seconds or 2 seconds). Thereafter, the pseudo-image processing unit 108 may convert the outside area to an intermediate partial pseudo-image having a resolution higher than that of the partial pseudo-image but lower than that of the clear partial pseudo-image and may display the intermediate partial pseudo-image. Accordingly, a user who performs fingerprint registration will be able to visually recognize that fingerprint registration has been made for a certain portion of the entire fingerprint or that fingerprint registration is to be made for a certain portion of the entire fingerprint.

Figure 4E:
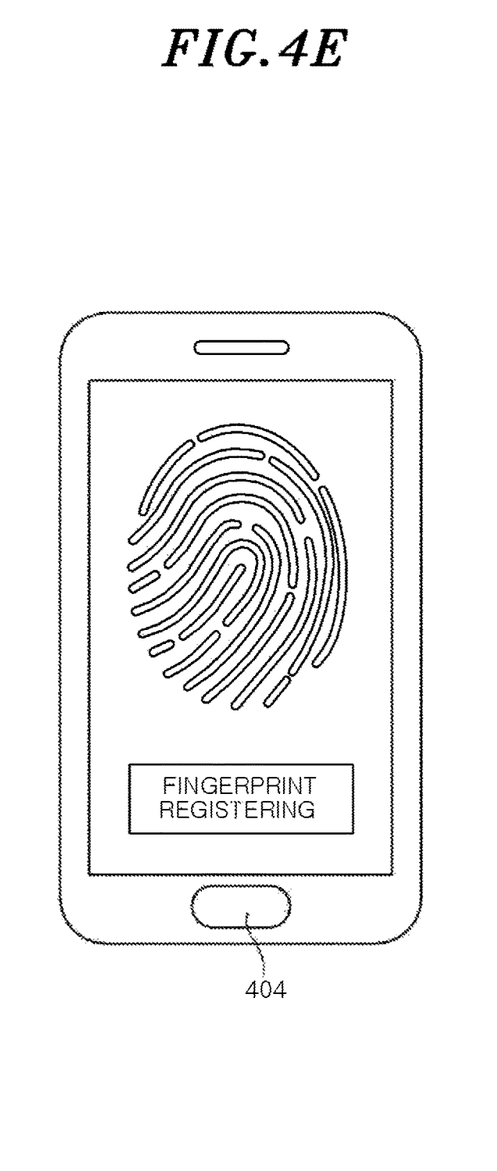

As illustrated in FIG. 4E as one example, if the pseudo image displayed on the display panel is the intermediate partial pseudo-image or a mixture of the blurred partial pseudo-image and the intermediate partial pseudo-image, a user who performs fingerprint registration will be able to visually recognize that the fingerprint registration has not yet been made to obtain a predetermined number of images.

Figure 4F:
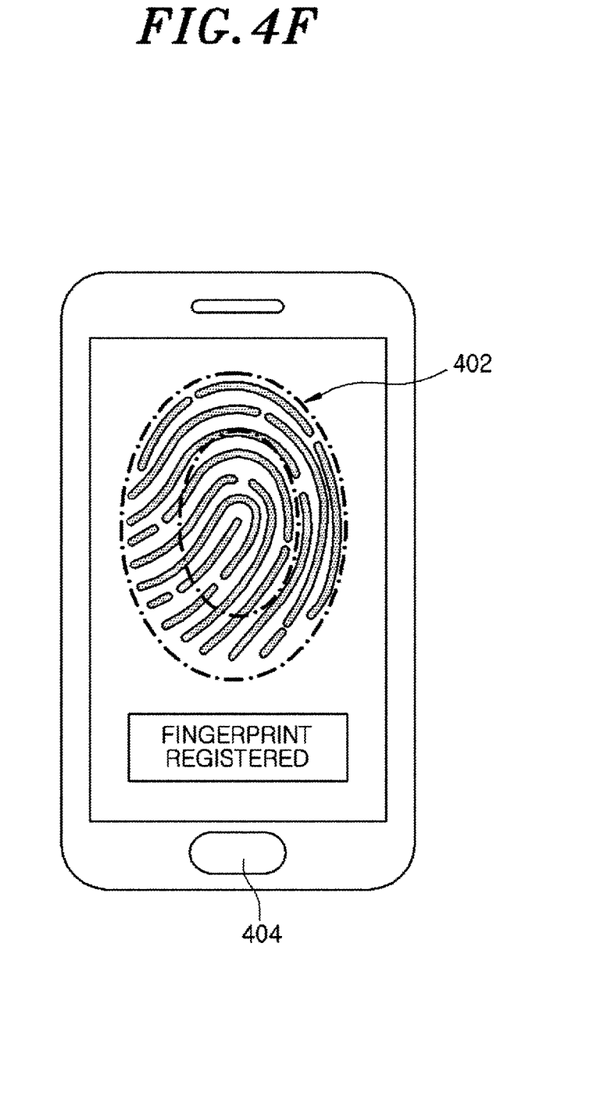

If the registration of the authentication-purpose fingerprint images, namely the partial fingerprint image of at least one inside area and the partial fingerprint images of a plurality of predetermined partial outside regions has been completed, as illustrated in FIG. 4F as one example, the pseudo-image processing unit 108 may provide a function of converting the pseudo image (the intermediate pseudo image) displayed on the display panel to a clear pseudo image having a higher resolution than that of the blurred pseudo image and displaying the clear pseudo image.

Then, the fingerprint registration unit 110 may provide a function of registering (storing) the acquired fingerprint image (the partial fingerprint image of the inside area or the outside area) as an authentication-purpose fingerprint image in the memory 112 in association with the conversion to the clear partial pseudo-image.

Next, a series of processes of acquiring fingerprint data for user authentication in a terminal through the use of the fingerprint data registering apparatus according to the present embodiment having the aforementioned configuration will be described in detail.

Figure 3A:
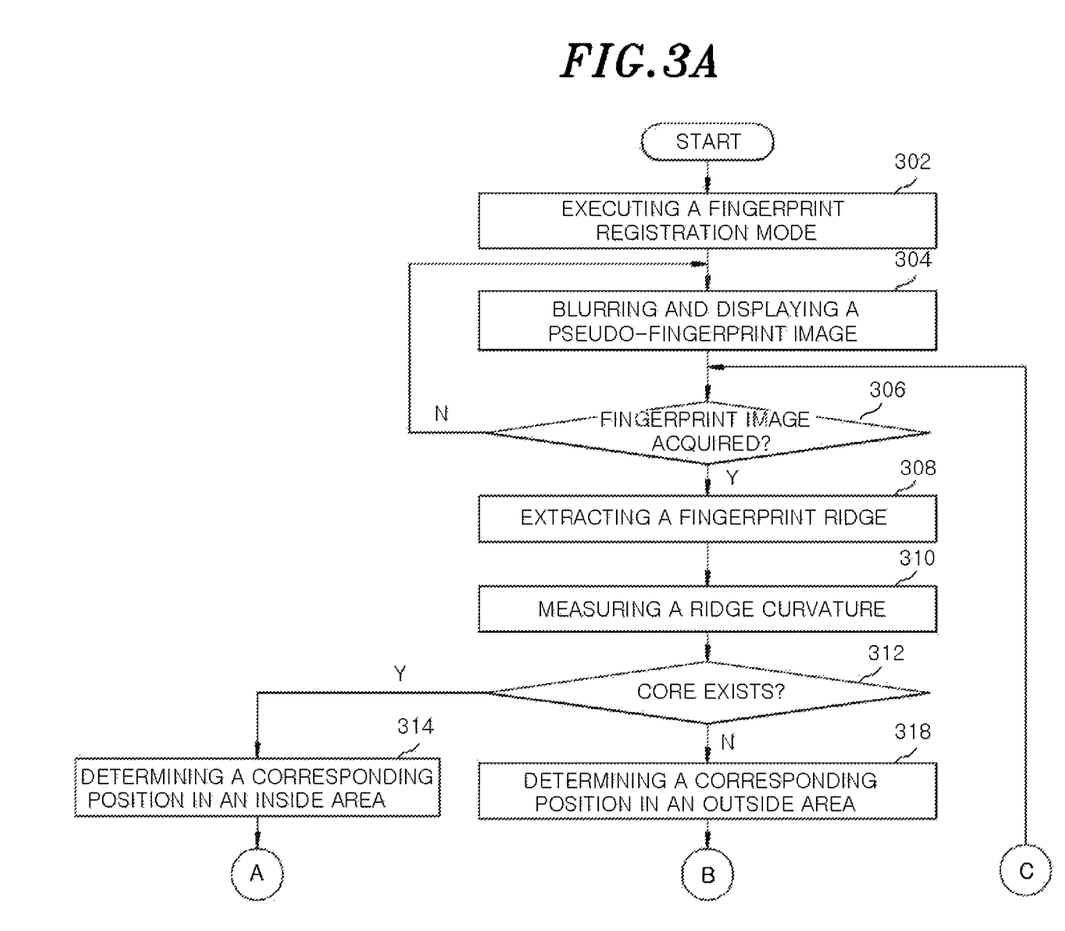
FIGS. 3A and 3B are a flowchart illustrating major processes of acquiring fingerprint data through the use of visual feedback of a fingerprint image according to the embodiment.
Figure 3B:
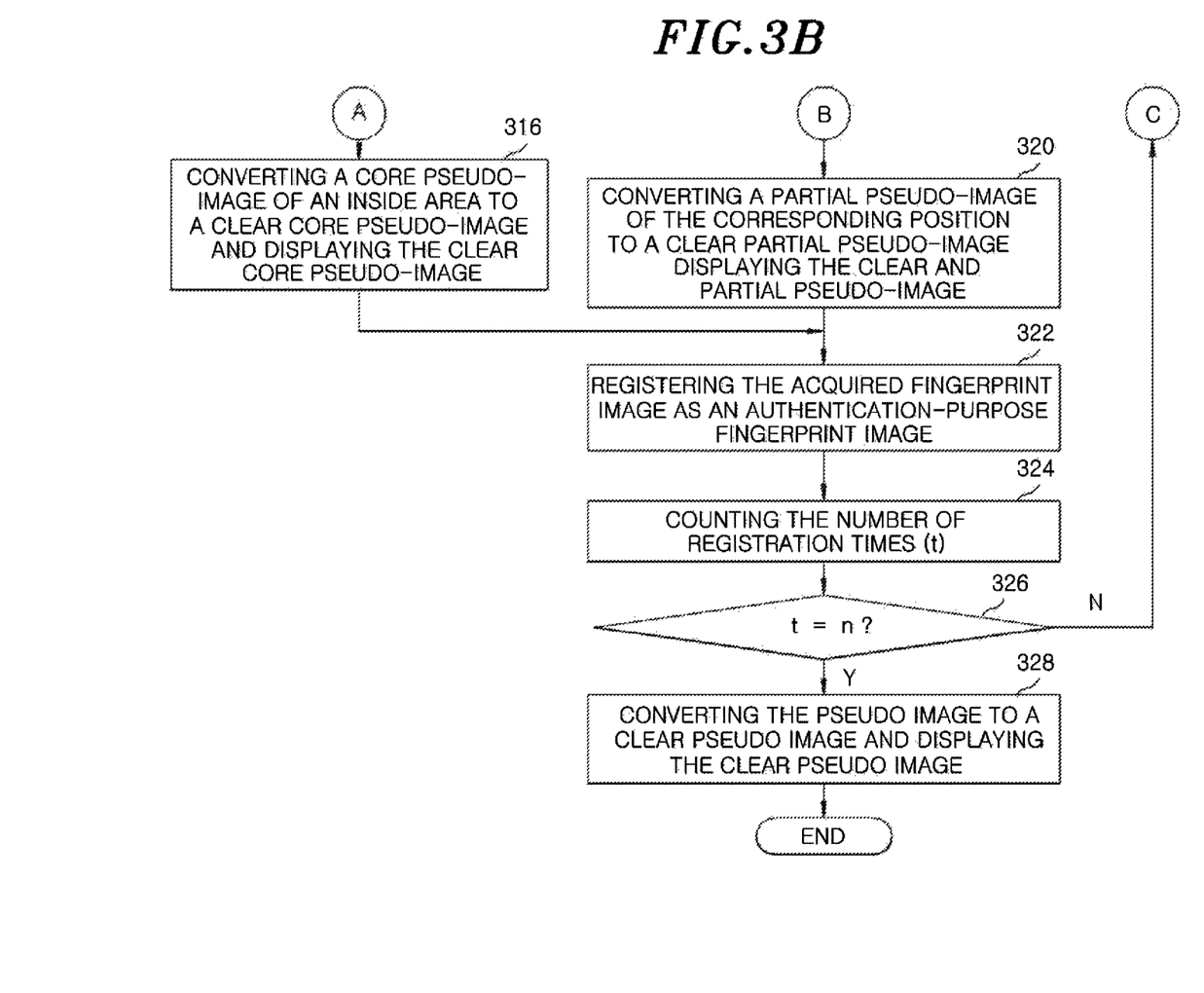

FIGS. 3A and 3B are a flowchart illustrating major processes of acquiring fingerprint data through the use of visual feedback of a fingerprint image according to the present embodiment.

Referring to FIGS. 3A and 3B, if a fingerprint registration mode is executed in response to a user's operation (interface operation) (step 302), the pseudo-image display unit 102 calls out a pseudo image pre-stored in the memory 112 and blurs the pseudo image. Thereafter, the pseudo-image display unit 102 displays a blurred fingerprint-shaped pseudo image on the display panel 114 of the terminal (step 304). In this regard, the blurring process of the pseudo image may be performed by, for example, median filtering or low band path filtering.

Then, monitoring is performed to determine whether a fingerprint image (or a partial fingerprint image) is acquired from the sensor (fingerprint recognition sensor) 300 installed in the terminal (step 306). If the fingerprint image is acquired, the fingerprint position extraction unit 104 extracts a fingerprint position from the acquired fingerprint image.

More specifically, the ridge extraction module 202 illustrated in FIG. 2 extracts a fingerprint ridge from the acquired fingerprint image (or the acquired partial fingerprint image) (step 308). The curvature calculation module 204 measures a curvature of the fingerprint ridge based on the extracted fingerprint ridge information (step 310).

Then, the image analysis module 206 determines (analyzes) the presence or absence of a fingerprint core in the fingerprint image based on a direction histogram using the measured curvature information (step 312). In this regard, a circularly converging portion may be defined as a fingerprint core. This fingerprint core may be referred to as an inside area of the entire fingerprint. The remaining area may be referred to as an outside area.

If the determination result in step 312 reveals that the fingerprint image is acquired from the inside area where the fingerprint core exists, the area determination module 208 determines that the acquired fingerprint image (or the acquired partial fingerprint image) is acquired from a fingerprint position in the inside area, and notifies this fact to the pseudo-image processing unit 108 (step 314).

In response, as illustrated in FIG. 4B as one example, the pseudo-image processing unit 108 converts a core pseudo-image (partial pseudo-image) of the pseudo image corresponding to the partial image (the core partial image) of the inside area to a clear core pseudo-image (clear partial pseudo-image) and displays the clear core pseudo-image for a predetermined time (step 316) (visual feedback). In this regard, the partial pseudo-image may be converted to and displayed as the clear partial pseudo-image in such a way that the resolution of the core pseudo-image (partial pseudo-image) gradually increases (the partial pseudo-image becomes gradually clear).

Thereafter, the pseudo-image processing unit 108 executes the converting and displaying process for a predetermined time. Then, the pseudo-image processing unit 108 converts the core pseudo-image to an intermediate core pseudo-image (intermediate partial pseudo-image) and displays the intermediate core pseudo-image. This is to enable a user, who performs fingerprint registration, to visually recognize that fingerprint registration has been made for a certain portion of the entire fingerprint or that fingerprint registration is to be made for a certain portion of the entire fingerprint. In this regard, the intermediate partial pseudo-image may have a resolution which is higher than that of the partial pseudo-image but lower than that of the clear partial pseudo-image.

If the determination result in step 312 reveals that the fingerprint image is acquired from the outside area where the fingerprint core does not exist, the area determination module 208 determines that the acquired fingerprint image (or the acquired partial fingerprint image) is acquired from a fingerprint position in the outside area, and notifies this fact to the pseudo-image processing unit 108 (step 318).

In response, as illustrated in FIG. 4D as one example, the pseudo-image processing unit 108 converts the partial pseudo-image corresponding to the partial image of the outside area to a clear partial pseudo-image and displays the clear partial pseudo-image for a predetermined time (visual feedback) (step 320). In this regard, the partial pseudo-image may be converted to and displayed as the clear partial pseudo-image in such a way that the resolution of the partial pseudo-image of the outside area gradually increases (the partial pseudo-image becomes gradually clear).

In FIG. 4D, there is illustrated an example in which the entire outside area is converted to and displayed as a clear partial pseudo-image. However, this is nothing more than an exemplary description presented for the sake of convenience in description and for the sake of increased understanding. The present disclosure is not limited thereto. In reality, it may be preferred that only the partial pseudo-image of the position corresponding to the acquired partial fingerprint image among a plurality of partial pseudo-images (e.g., in a plan view, upper, lower, left and right partial pseudo-images) in the outside area is converted to and displayed as a clear partial pseudo-image.

The pseudo-image processing unit 108 executes the converting and displaying process for a predetermined time. Then, the pseudo-image processing unit 108 converts the partial pseudo-image of the outside area to an intermediate partial pseudo-image and displays the intermediate partial pseudo-image. This is to enable a user, who performs fingerprint registration, to visually recognize that fingerprint registration has been made for a certain portion of the entire fingerprint or that fingerprint registration is to be made for a certain portion of the entire fingerprint. In this regard, the intermediate partial pseudo-image may have a resolution which is higher than that of the partial pseudo-image but lower than that of the clear partial pseudo-image.

Next, the fingerprint registration unit 110 registers (stores) the acquired fingerprint image (the partial fingerprint image of the inside area or the outside area) as an authentication-purpose fingerprint image in the memory 112 in association with the conversion to the clear partial pseudo-image (step 322). Thereafter, the fingerprint registration unit 110 counts the number of registration times (step 324).

Then, the fingerprint registration unit 110 determines whether the counted number of registration times t has reached a predetermined target registration number n (step 326). If the determination result of step 326 reveals that t has not reached n, the process comes back to step 306 to repeat the subsequent steps. In other words, according to the present embodiment, the process of steps 306 to 326 is repeatedly performed a predetermined number of times until a target number of partial fingerprint images are registered in the terminal.

If the determination result of step 326 reveals that t has reached n, the fingerprint registration unit 110 notifies this fact to the pseudo-image processing unit 108. Consequently, as illustrated in FIG. 4F as one example, the pseudo-image processing unit 108 converts the pseudo image (the intermediate pseudo image), which is being displayed on the display panel, to a clear pseudo image having a higher resolution than that of the blurred pseudo image and displays the clear pseudo image for a predetermined time (step 328). Thereafter, a message which reads, for example, "fingerprint registration completed", is displayed on the display panel, whereby the fingerprint registration mode is completed.

The fingerprint data registering method according to the present embodiment may be stored as computer-executable codes (computer program codes) in a computer-readable (or portable-computer-readable) storage medium 20. The computer-readable storage medium 20 may include all kinds of storage devices for storing data which are readable by a computer system. Examples of the computer-readable storage medium 20 include a ROM, a RAM, a CD-ROM, a magnetic tape, a floppy disk, an optical data storage device and a mobile application.

The combinations of the respective blocks of the accompanying drawings and the respective steps of the flowchart may be performed by computer program instructions. The computer program instructions may be installed in a general-purpose computer, a special-purpose computer or a processor of other programmable data processing devices. Thus, the instructions performed by a computer or a processor of other programmable data processing devices may generate a means for performing the functions of the respective blocks of the block diagrams or the functions described at the respective steps of the flowchart.

Furthermore, the computer program instructions may be stored a computer-usable or computer-readable memory capable of aiming at a computer or other programmable data processing devices in order to realize a function in a specified manner. Thus, the instructions stored in the computer-usable or computer-readable memory may manufacture a production item including an instruction means for performing the functions of the respective blocks of the block diagrams or the functions described at the respective steps of the flowchart.

In this regard, the computer program instructions may be installed on a computer or other programmable data processing devices. Thus, the instructions that operates a computer or other programmable data processing devices by performing a series of operation steps on the computer or other programmable data processing devices and generating a process executed by the computer may provide steps for executing the functions of the respective blocks of the block diagrams or the functions described at the respective steps of the flowchart.

Furthermore, the respective blocks or the respective steps may indicate a module, a segment, or a part of codes including at least one or more executable instructions for executing a specified logical function (specified logical functions). It should be noted that in some alternative embodiments, the functions referred to in the blocks or steps may be performed in different orders. For example, two blocks or steps illustrated one after another may be performed substantially at the same time or may often be performed in the reverse order depending on the corresponding function.

The foregoing descriptions are nothing more than exemplary descriptions of the technical concept of the present disclosure. A person having an ordinary knowledge in the technical field to which the present disclosure pertains will be able to easily understand that many different substitutions, modifications and changes can be made without departing from the essential characteristics of the present disclosure. That is to say, the embodiments disclosed herein are not intended to limit the technical concept of the present disclosure but are intended to describe the technical concept of the present disclosure. The scope of the technical concept of the present disclosure shall not be limited by these embodiments.

Accordingly, the protection scope of the present disclosure shall be construed based on the appended claims. All the technical concepts falling within the scope equivalent to the claims shall be construed to be included in the protection scope of the present disclosure.

What is claimed is:

1. A fingerprint data registering method, comprising:
   blurring a fingerprint-shaped pseudo image and displaying the blurred pseudo image;
   extracting a fingerprint position of a fingerprint image acquired for authentication registration;
   determining a position in the pseudo image, which corresponds to the extracted fingerprint position;
   converting a part of the blurred pseudo image at the corresponding position to a clear partial pseudo-image having a higher resolution than that of the blurred pseudo image and displaying the clear partial pseudo-image; and
   registering the acquired fingerprint image as an authentication-purpose fingerprint image in association with said converting and displaying, wherein the fingerprint position of the acquired fingerprint image is one of an inside area including a fingerprint core and an outside area surrounding the inside area, wherein the outside area includes a plurality of partial outside areas distributed around the fingerprint core, and wherein said extracting includes:

extracting a fingerprint ridge from the acquired fingerprint image;

measuring a curvature of the extracted fingerprint ridge;

determining presence or absence of the fingerprint core based on a direction histogram using the measured curvature; and determining whether the fingerprint position is a fingerprint position in the inside area or a fingerprint position in the outside area, based on a determination result in said determining presence or absence of the fingerprint core.

2. The method of claim 1, further comprising:

converting the blurred pseudo image to a clear pseudo image having a higher resolution than that of the blurred pseudo image and displaying the clear pseudo image, when registration of an authentication-purpose fingerprint image with respect to the inside area and the partial outside areas is completed by repeatedly performing said extracting, said determining, said converting and displaying and said registering a predetermined number of times.

3. The method of claim 1, wherein the part of the blurred pseudo image is converted to and displayed as the clear partial pseudo-image in such a way that the resolution gradually increases.

4. The method of claim 1, wherein the clear partial pseudo-image is maintained for a predetermined time and is then converted to and displayed as an intermediate partial pseudo-image which has a resolution higher than that of the blurred partial pseudo-image but lower than that of the clear partial pseudo-image.

5. A non-transitory computer-readable storage medium including computer executable instructions, wherein the instructions, when executed by a processor, cause the processor to perform the method of claim 1.

6. A computer program including computer executable instructions stored in a non-transitory computer-readable storage medium, wherein the instructions, when executed by a processor, cause the processor to perform the method of claim 1.

7. A fingerprint data registering apparatus, comprising a computer program including computer executable instructions stored in a non-transitory computer-readable storage medium, wherein the instructions, when executed by a processor, cause the apparatus to perform:

blur a fingerprint-shaped pseudo image and to display the blurred pseudo image on a display panel;

extract a fingerprint position from a fingerprint image acquired by a sensor;

determine a position in the pseudo image, which corresponds to the extracted fingerprint position;

convert a part of the blurred pseudo image at the determined corresponding position to a clear partial pseudo-image having a higher resolution than that of the blurred pseudo image and to display the clear partial pseudo-image; and register the acquired fingerprint image as an authentication-purpose fingerprint image in a memory in association with the conversion to the clear partial pseudo-image, wherein the fingerprint position extraction performed by the apparatus further includes:

extracting a fingerprint ridge from the fingerprint image;

measuring a curvature of the extracted fingerprint ridge;

analyzing presence or absence of a fingerprint core in the fingerprint image based on a direction histogram using the measured curvature; and determining that the fingerprint image is acquired from a fingerprint position of an inside area if the fingerprint core exists in the fingerprint image, and to determine that the fingerprint image is acquired from a fingerprint position of an outside area if the fingerprint core does not exist in the fingerprint image.

8. The apparatus of claim 7, wherein the outside area includes a plurality of partial outside areas distributed around the fingerprint core, and the fingerprint position extraction unit is configured to extract one of the partial outside areas as the fingerprint position.

9. The apparatus of claim 8, wherein the pseudo-image processing unit is configured to convert the blurred pseudo image to a clear pseudo image having a higher resolution than that of the blurred pseudo image and to display the clear pseudo image, when registration of an authentication-purpose fingerprint image with respect to the inside area and the partial outside areas is completed.

10. The apparatus of claim 7, wherein the pseudo-image processing unit is configured to convert the part of the blurred pseudo image to the clear partial pseudo-image and to display the clear partial pseudo-image in such a way that the resolution gradually increases.

11. The apparatus of claim 7, wherein the pseudo-image processing unit is configured to maintain the clear partial pseudo-image for a predetermined time and then to convert the clear partial pseudo-image to an intermediate partial pseudo-image and to display the intermediate partial pseudo-image, the intermediate partial pseudo-image having a resolution higher than that of the blurred pseudo image but lower than that of the clear partial pseudo-image.

* * * * *